United States Patent
Auerbach et al.

(10) Patent No.: US 8,626,739 B2
(45) Date of Patent: *Jan. 7, 2014

(54) METHODS AND SYSTEMS FOR PROCESSING MEDIA FILES

(75) Inventors: David Benjamin Auerbach, Brooklyn, NY (US); Stephen R. Lawrence, Mountain View, AZ (US); David Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,693

(22) Filed: Dec. 12, 2011

(65) Prior Publication Data
US 2012/0179664 A1    Jul. 12, 2012

Related U.S. Application Data

(63) Continuation of application No. 10/813,895, filed on Mar. 31, 2004, now Pat. No. 8,099,407.

(51) Int. Cl.
*G06F 17/30* (2006.01)
(52) U.S. Cl.
USPC ............................ 707/709; 707/740; 709/224
(58) Field of Classification Search
USPC ......... 707/708, 715, 739, 740, 749, 758, 771, 707/953, 709; 709/224
See application file for complete search history.

(56) References Cited

U.S. PATENT DOCUMENTS

| | | |
|---|---|---|
| 5,701,469 A | 12/1997 | Brandli et al. |
| 5,742,816 A * | 4/1998 | Barr et al. ..................... 707/728 |
| 5,907,836 A | 5/1999 | Sumita et al. |
| 6,026,388 A | 2/2000 | Liddy et al. |
| 6,092,101 A | 7/2000 | Birrell et al. |
| 6,188,277 B1 | 2/2001 | Borodulin et al. |
| 6,282,548 B1 | 8/2001 | Burner et al. |
| 6,330,589 B1 | 12/2001 | Kennedy |
| 6,487,555 B1 | 11/2002 | Bharat |
| 6,513,036 B2 | 1/2003 | Fruensgaard et al. |
| 6,708,293 B2 * | 3/2004 | Kaler et al. ..................... 714/39 |
| 6,728,763 B1 * | 4/2004 | Chen ............................. 709/219 |
| 7,162,473 B2 | 1/2007 | Dumais et al. |
| 7,346,613 B2 | 3/2008 | Hurst-Hiller et al. |
| 7,370,035 B2 | 5/2008 | Gross et al. |
| 7,634,546 B1 | 12/2009 | Strickholm et al. |

(Continued)

FOREIGN PATENT DOCUMENTS

EP    1209866 A2    5/2002

OTHER PUBLICATIONS

Pingali et al., Instantly Indexed Multimedia Databases of Real World Events, Multimedia, IEEE Transactions on, vol. 4, Issue 2, Jun. 2002, pp. 269-282.*

*Primary Examiner* — Greta Robinson
(74) *Attorney, Agent, or Firm* — Fenwick & West LLP

(57) ABSTRACT

Systems and methods for processing media files are described. In one embodiment, one or more events are captured having associated event data and associated with a client device, wherein each event is associated with an article and at least one of the articles is a media file, wherein at least one of the events is captured in real time upon the occurrence of the event, at least some of the event data and articles associated with the events are indexed and stored, a search query is received, and the at least one media file is determined as relevant to the search query.

17 Claims, 3 Drawing Sheets

(56) References Cited

U.S. PATENT DOCUMENTS

| | | |
|---|---|---|
| 7,650,403 B2 | 1/2010 | Koetke et al. |
| 7,676,553 B1 | 3/2010 | Laucius et al. |
| 8,099,407 B2 | 1/2012 | Auerbach et al. |
| 8,203,952 B2 * | 6/2012 | Borkovsky et al. ........ 370/230.1 |
| 8,386,728 B1 | 2/2013 | Ionescu et al. |
| 2001/0049677 A1 | 12/2001 | Talib et al. |
| 2002/0055844 A1 | 5/2002 | L'Esperance et al. |
| 2002/0059265 A1 * | 5/2002 | Valorose, III ................. 707/100 |
| 2003/0050966 A1 | 3/2003 | Dutta et al. |
| 2003/0083947 A1 | 5/2003 | Hoffman et al. |
| 2003/0154293 A1 | 8/2003 | Zmolek |
| 2003/0185379 A1 | 10/2003 | O'Connor et al. |
| 2003/0212654 A1 | 11/2003 | Harper et al. |
| 2003/0233419 A1 | 12/2003 | Beringer |
| 2004/0044962 A1 | 3/2004 | Green et al. |
| 2005/0033803 A1 | 2/2005 | Vleet et al. |
| 2005/0080792 A1 | 4/2005 | Ghatare |
| 2005/0165777 A1 | 7/2005 | Hurst-Hiller et al. |
| 2006/0100912 A1 | 5/2006 | Kumar et al. |
| 2007/0033275 A1 | 2/2007 | Toivonen et al. |

\* cited by examiner

METHODS AND SYSTEMS FOR PROCESSING MEDIA FILES

CROSS-REFERENCE TO RELATED APPLICATIONS

This application is a continuation of co-pending U.S. application Ser. No. 10/813,895, filed Mar. 31, 2004, which is herein incorporated by reference in its entirety.

FIELD OF THE INVENTION

The invention generally relates to search engines. More particularly, the invention relates to methods and systems for processing media files.

BACKGROUND OF THE INVENTION

Users generate and access a large number of articles, such as emails, web pages, word processing documents, media files, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for processing media files. In one embodiment, one or more events are captured having associated event data and associated with a client device, wherein each event is associated with an article and at least one of the articles is a media file, wherein at least one of the events is captured in real time upon the occurrence of the event, at least some of the event data and articles associated with the events are indexed and stored, a search query is received, and the at least one media file is determined as relevant to the search query. The media file can be one or more of an audio file, a video file, an image file, some combination, or a scripted timeline presentation of different media files.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Embodiments of the present invention comprise methods and systems for processing media files.

System Architecture

Figure 1:
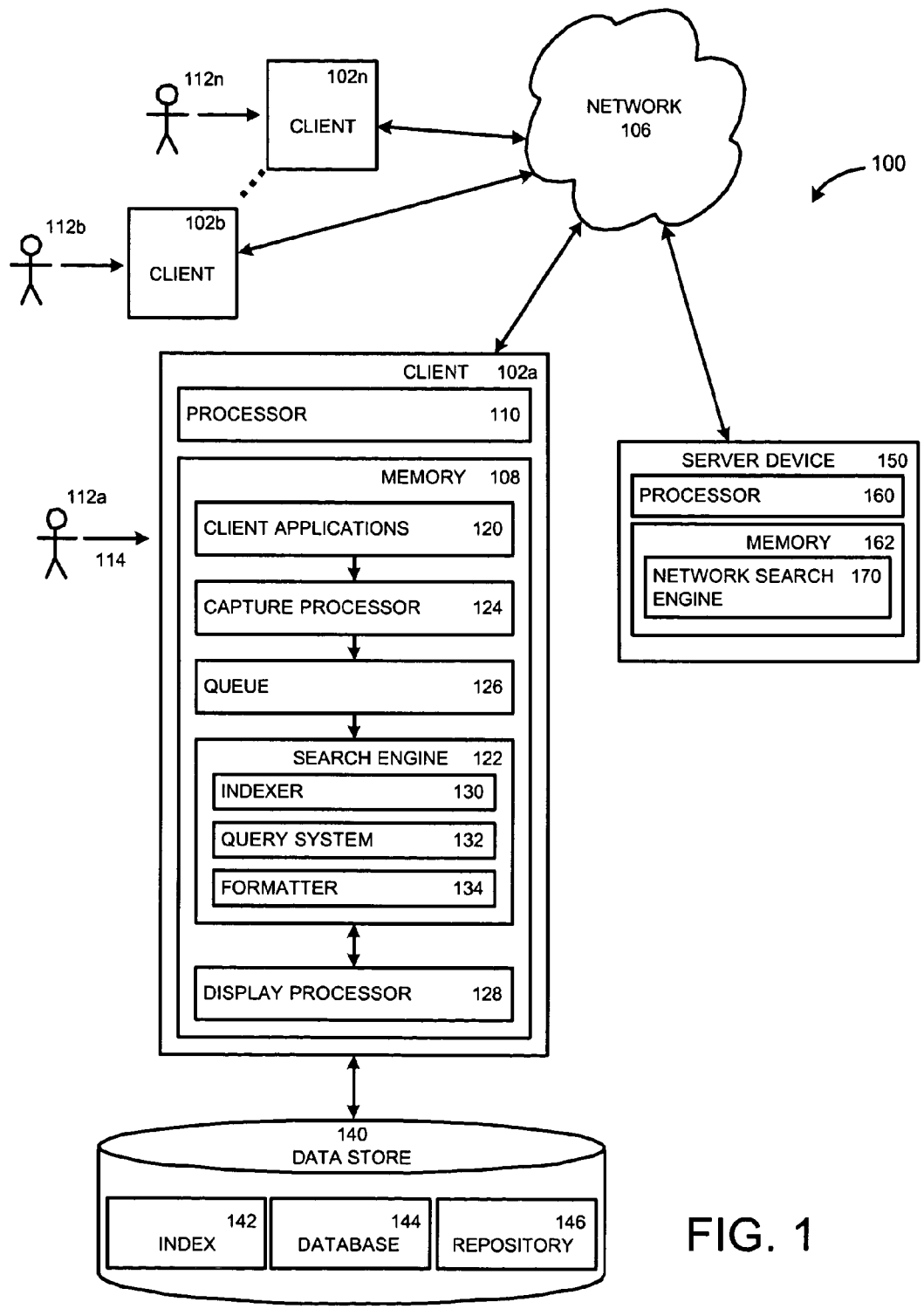
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as playing an audio file, editing a video file, uploading an image file, inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contains a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include playing an audio file, editing a video file, uploading an image file, sending or receiving an email message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the playing of an audio file by the user 112a can include the title of the file, the location of the file, the date the file was saved to the client device, the data contained in the file, the quality of the file, the format of the file, and a pointer to the location of the file.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an audio or video stream, such as Unicast, Multicast or broadcast. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an audio file event, such as a song in mp3 format played by the user 112a, can include the title of the song, the artist of the song, the album title, the genre of the song, the location of the file, the data in the file that was saved to the client device, the source where the file was acquired from, the quality of the file, the format of the file, the ownership information of the file, the Digital Rights Management (DRM) information, and other suitable information. An event schema for a video, such as a home movie being viewed by the user 112a can include the title of the file, the date the file was created, a date the file was edited (if any), the date the file was saved to the client device, the format of the file, the location of the file, the individuals who appear in the file, annotated information on the file, and links to similar files. Links to similar files can be based on time, source, themes or genres, individuals appearing in the file, and other suitable linking information. An event schema for an image file being saved by a user can include the title of the image file, the time saved, the location of the image file, the format of the image file, a license associated with the file, the location where the image was taken, the quality of the image, the camera aspects of the image, such as lens, focus, lighting and flash. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as email, examining a portion of an article, such as selecting a portion of text or moving a mouse over a portion of a web page, changing an article, such as editing a video file, closing an article, such as closing a media player application or changing an audio file being listened to, loading, saving, opening, or viewing an article, such as an image file, listening to or saving an mp3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages book marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently event are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

In the embodiment shown in FIG. 1, when the indexer 130 receives an event, the indexer 130 can determine, from the event, terms (if any) associated with the event, the time of the event (if available), images (if any) associated with the event, and/or other information defining the event. The indexer 130 can also determine if the event relates to other events and associate the event with related events. For example, for a media file event, the indexer 130 can associate the media file event with other versions (if any) associated with the media file event. The media file events can be associated with each other in an associated events object, which can be stored in the data store 140. The indexer 130 may further identify and compile event data from external sources, such as local and global databases, websites, and a network search engine, allowing the indexer 130 to augment the available information or event data associated with the event. For example, if a user plays a song and the media file containing the song only has title information associated with it, the indexer 130 can determine the lyrics, artist, year, genre, album, and album image for external sources and associate this data with the event.

The indexer 130 can send and incorporate the terms and times, associated with the event in the index 142 of the data store 140. The event can be sent to the database 144 for storage and the content of the associated article and any associated images can be stored in the repository 146. The associated events object can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102*a-n*, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102*a*. The search engine 170 then can provide a result set to the client device 102*a* via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102*a* is a stand-alone device and is not connected to a network. The system 100 shown in FIG. 1 is merely exemplary, and is used to explain the exemplary methods shown in FIGS. 2 through 3.

Process

Various methods in accordance with embodiments of the present invention may be carried out. For example, in one embodiment, one or more events are captured having associated event data and associated with a client device, wherein each event is associated with an article and at least one of the articles is a media file, wherein at least one of the events is captured in real time upon the occurrence of the event, at least some of the event data and articles associated with the events are indexed and stored, a search query is received, and the at least one media file is determined as relevant to the search query. An event with an associated media file article may be referred to as a media file event. The media files can be audio files, a video files, image files, some combination, or a scripted timeline presentation of different media files.

The search query can be an explicit query or an implicit query. In one embodiment, capturing the event associated with the media file can comprise monitoring a media application to determine event data associated with the event and compiling the event from at least some of the event data. Capturing the event associated with the media file can comprise determining event data external to the media file. The event data external to the media file can be determined based at least in part on one or more of a local database, a global database, a web page, and a network search engine. Capturing the event associated with the media file can also comprise determining text that identifies the media file and including the text as event data associated with the event. In one embodiment, indexing the event associated with the media file can comprise associating the media file event with associated events. The associated event can comprise a different version of the event.

According to one embodiment, capturing the event associated with the media file can comprise identifying the event based at least in part on one or more of network activity, system activity, and media application activity. Capturing the event associated with the media file can comprise identifying the event based at least in part on a display area associated with a media application and identifying at least some of the event data by analyzing the display area. Capturing the event associated with the media file can comprise identifying the event based at least in part on calls to input or output devices and identifying at least some of the event data by analyzing the calls.

Figure 2:
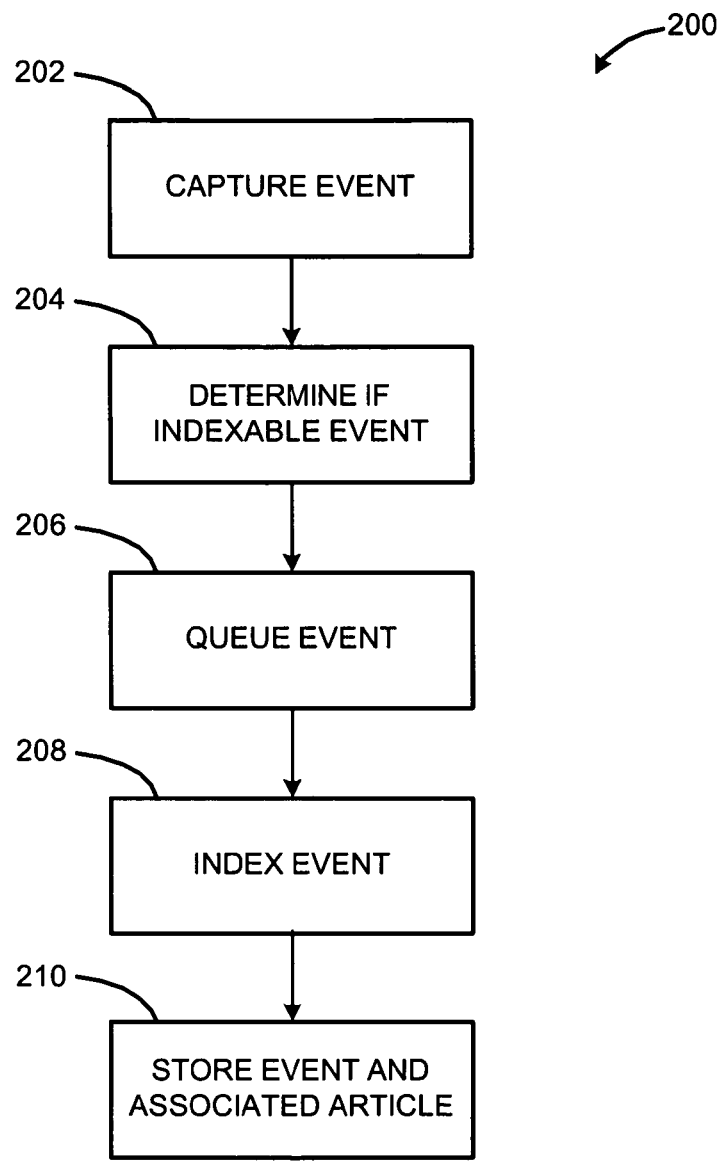
FIG. 2 is a flow diagram illustrating an exemplary method of capturing, indexing, and storing an event associated with a client device in one embodiment of the present invention.

FIG. 2 illustrates an exemplary method 200 that provides a method for capturing, indexing, and storing an event. This exemplary method is provided by way of example, as it will be appreciated from the foregoing description of exemplary embodiments that there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2. However, it will be appreciated that the invention is not limited to a particular system, such as that described with reference to FIG. 1.

In 202, the capture processor 124 captures an event. The event can be a media file event, such as an audio, video, or image file event, a combination media file event, or a scripted timeline presentation of different media files event that may have auxiliary associated content, such as subtitles, optional audio tracks and director commentary, or can be a non-media file event, such as an email, instant messenger, web page or presentation event. The event can be a real-time event or can be a historical event. The capture processor 124 can capture a real-time event by identifying and compiling event data associated with the event upon the occurrence of the event. The capture processor 124 can capture a historical event, for example, by crawling the memory 108 or associated data storage device of the client device 112*a* for previously uncaptured articles or receiving articles or data from client applications and identifying and compiling event data associated with the event. Such a crawl may be requested by the user, may be performed at certain intervals, or may occur upon some other suitable condition. The capture processor 124 may have separate capture components for each client application, network monitoring, performance data capture, keystroke capture, and display capture. For example, the capture processor 124 may have a different capture component associated with each media application or each type of media application. Alternatively, a single capture component may be used to capture media file events.

In one embodiment, the capture component can use a generalized event definition mechanism, such as an event schema that it has previously defined and registered with the client device 102a, to capture or express the event. For example, an event schema for an audio file event, such as a song in mp3 format played by the user 112a, can include the title of the song, the artist of the song, the album title, the genre of the song, the location of the file, the data the file was saved to the client device, the quality of the file, the format of the file, and a pointer to the location of the file. An event schema for a video, such as a home movie being viewed by the user 112a can include the title of the file, the date the file was created, a date the file was edited (if any), the date the file was saved to the client device, the format of the file, the location of the file, and a pointer to the location of the file. An event schema for an image file being saved by a user can include the title of the image file, the time saved, the location of the image file, the format of the image file, and a pointer to the location of the image file.

The capture processor 124 can identify and compile event data according to the format described by the relevant event schema in order to capture the event. Event data for a media file event can be included in associated metadata from the file, such as ID3 tags in a music file. The event data for a media file event can also be determined from sources external to the media file, such as a local or global database or a network search engine. For example, event data for an audio media file event, such as a song, can be determined by looking up information about the song, such as, for example, artist, title, genre, album cover art, and lyrics, based on some identifier. This lookup may be done using the network search engine 170. Alternatively, the lookup may be done using a database associated with the client-device 102a. The identifier can be, for example, a unique value based on the wavelength, length or other information associated with the audio media file, the name of the file, metadata within the file, or a fingerprint that has been added to the file. This identification and compilation of event data can occur in real time as the events are occurring or can occur during a crawl of the user's files. In one embodiment, the capture processor 124 can determine or generate text that can identify the audio portion of a media file and include this text as event data in the event. This text can be used in indexing the event. For an audio media file event, such as a song, for example, in one embodiment, the capture processor 124 can determine from an external source, such as a web site, the lyrics associated with the song in a text format and compile this text as event data associated with the media file event.

In one embodiment, the capture processor 124 can identify a media file event by network activity, such as detection of the downloading of an audio file from an associated network by monitoring network traffic or with a browser plug-in. The capture processor 124 can identify a media file event by system activity. For example, the capture processor 124 can determine that a media application is in use, such as through use of an Application Programming Interface (API) with the media application, monitoring calls to an audio or video driver, or monitoring display calls to a display area, such as a window, associated with the media application. The capture processor 124 can capture event data by monitoring calls to an input or output device or driver, such as a microphone or speaker. Additionally, the capture processor 124 can extract event data associated with the media file from a display area associated with the media application. For example, the display area may contain metadata about an audio file being played, such as the title, artist, and other information. As another example, the display area can be analyzed to identify images that are likely to be photographs based on the distribution and variation in pixel intensity across sections of the screen. Whereas typical items on a display device, such as text and borders, contain sharp edges, photographs may contain smooth variations in pixel values, for example. The amount of compression possible on a segment of the screen may also help identify a photograph, because photographs may be less compressible. These features combined with the typical size of photographs on the display device, can allow the identification and extraction of photos. Analyzing the display area associated with a display device may be advantageous because identifying the media file alone may not allow identification of all desired event data, and analysis of the media application alone may not allow access to the event data for the media file.

In 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed or sent for storage by the indexer 130. Indexable events can be indexable real-time events or historical events. For example, in one embodiment, the playing, viewing or editing of a media file can be considered an indexable event. Opening a media application may be considered a non-indexable event.

If an indexable event is determined, then, in 206, the event can be sent by the capture processor 124 to the queue 126 with an indication that it is an indexable event. In the embodiment shown, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, in 206, the non-indexable event can be sent by the capture processor 124 to the user state queue of the queue 126 with an indication that it is not to be indexed.

In one embodiment, the queue 126 holds the event until the search engine is ready to receive it. Based on the event data, the event can be prioritized on the queue 126 for handling. For example, in one embodiment, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the event is indexed. In one embodiment, the indexer 130 indexes the event and can retrieve an event from the queue 126 when it is ready to process the event. In one embodiment, the indexer 130 determines if the event is a duplicate event and if not assigns an Event ID to the event. The indexer 130 can also associate the event with related events. For example, if the user 112a edits an image file and saves it with the same filename, thus overwriting the original file, the revised image file can be associated to the original image file by the indexer 130 through an associated events object. In the embodiment shown in FIG. 2, the indexer determines indexable terms associated with the event, dates and times associated with the event, and other data associated with the event from the event schema.

In 210, the event can be stored in the database 144 and the content of the event can be stored in the repository 146. The event, such as a media file event can be stored in the data store 140. In the embodiment shown in FIG. 2, the associated media file can be stored in the repository 146. The event and associated events object can be stored in the database 144. In one embodiment, the Event ID from the event is associated with terms in the index 142 that equate to the indexable terms of the event. For example, for an audio file event given an event ID "17" (for example) associated with an audio file of a David Bowie song entitled "Let's Dance", the event ID, 17, can be associated with the terms "David", "Bowie", and "Dance" in the index 142.

Figure 3:
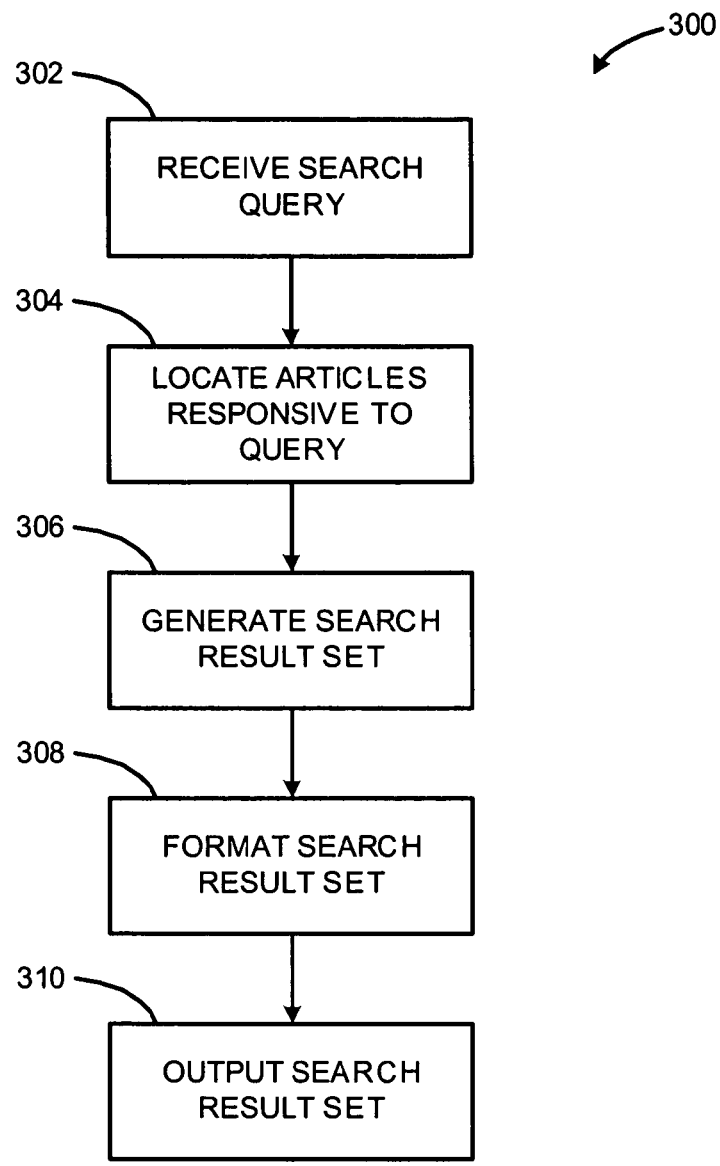
FIG. 3 is a flow diagram illustrating an exemplary method of processing a search query according to one embodiment of the present invention.

FIG. 3 illustrates an exemplary method 300 that provides a method for processing a search query, in accordance with one embodiment. This exemplary method is provided by way of example, as it will be appreciated from the foregoing description of exemplary embodiments that there are a variety of ways to carry out methods according to the present invention. The method 300 shown in FIG. 3 can be executed or otherwise performed by any of various systems. The method 300 is described below as carried out by the system 100 shown in FIG. 1 by way of example, various elements of the system 100 are referenced in the example method of FIG. 3.

In 302, the query system 132 receives a search query. The query can be an explicit query or an implicit query. An explicit query can be generated by a user inputting query terms into a search engine interface displayed on the client device 102a. An implicit query can be generated by the query system 132 based on a current user state. For example, the user 112a can enter the terms "David Bowie" into a search engine interface and the query system 132 can generate a search query based on the input terms. Alternatively, the user 112a can input the terms "David Bowie" in an email the user 112a is drafting. The capture processor 124 can capture this contextual event and it can be received by the query system 132. The query system 132 can generate a search query based on the terms captured in this contextual event.

In 304, the query system 132 locates articles relevant to the search query. The query system 132 can locate relevant articles by matching the terms of the search query with terms located in the index 142. For example, the query system 132 can match the terms of the query with terms in the index 142. From the matched terms, the query system 132 can determine events, stored in the database 144, associated with the terms through event IDs associated with the matched terms. From these events, the query system 132 can determine articles associated with the events. The articles can be stored in the repository 146. For the search query "David Bowie," for example, the query system 132 can locate various articles from various client applications that contain the query terms, such as, audio files, video files, image files, emails, instant messenger messages, previously viewed web pages, and other articles matched to the terms of the query. The query can also designate a time and the query system 132 can locate articles that are relevant to the query time. The query system 132 can also retrieve network articles, such as web pages, from a search engine 170 that are relevant to the query.

In 306, the query system 132 generates a search result set based on the located articles. In one embodiment, the query system 132 can sort and rank the located articles based on a variety of signals indicating the user's 112a preference for the articles. The search result set can contain a ranked list of article identifiers for articles associated with a variety of different client applications 120 and article identifiers for network articles. Each link can also contain a summary of the article as well as an image associated with the article. The result set can contain media files, such as audio, video, and image files and other articles (non-media files), such as emails, instant messenger messages, and web pages. For example, for the query "David Bowie", the result set may contain audio files of songs by David Bowie, video files of music videos from David Bowie, image files of David Bowie, emails and instant messenger messages discussing David Bowie, and web sites relating to David Bowie.

In 308, the search result set is formatted by the formatter 134. In one embodiment, the formatter 134 formats the result set in XML or HTML. In 310, the search result set is output, such as displayed on the client device 102a, by the display processor 128. For example, the search result set can be displayed on the display device associated with the client device 102a. If the search result set was generated in response to an implicit query the display processor 128 can determine an appropriate time to display the implicit search result set. The user 112a can then select an article identifier for an article and cause the output of the associated article on the display device.

The environment shown reflects a client-side search engine architecture embodiment. Other embodiments are possible, such as a stand-alone client device or a network search engine.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A system for processing media files comprising:
a processor for executing computer program code; and
a non-transitory computer-readable storage medium storing executable computer program code for:
   monitoring at least one application for occurrences of events wherein at least one event is associated with a media file;
   capturing the at least one event upon the occurrence of the event by queuing event data associated with the at least one event at a position in the queue;
   indexing and storing at least some of the event data and the media file associated with the at least one event at a time after the occurrence of the at least one event, wherein the time is based on performance data indicating a readiness to process the at least one event and the position in the queue;
   receiving a search query;
   locating at least one relevant media file from the indexed and stored events relevant to the search query; and
   outputting a result set comprising the at least one relevant media file.

2. The system of claim 1, wherein the search query is an explicit query.

3. The system of claim 1, wherein the search query is an implicit query.

4. The system of claim 1, wherein capturing the at least one event associated with the media file comprises monitoring a media application to determine event data associated with the at least one event and compiling the at least one event from at least some of the event data.

5. The system of claim 1, wherein capturing the at least one event associated with the media file comprises determining event data external to the media file.

6. The system of claim 5, wherein the event data external to the media file is determined based at least in part on one or more of a local database, a global database, a web page, and a network search engine.

7. The system of claim 1, wherein the media file comprises an audio file.

8. The system of claim 1, wherein the media file comprises a video file.

9. The system of claim 1, wherein the media file comprises an image file.

10. The system of claim 1, wherein the media file comprises a combination of audio and video.

11. The system of claim 1, wherein the media file comprises a scripted presentation of audio and video.

12. The system of claim 1, wherein capturing the at least one event associated with the media file comprises determining text that identifies the media file and including the text as event data associated with the at least one event.

13. The system of claim 1, wherein indexing at least some of the event data associated with the media file comprises associating the at least one event with at least one associated event.

14. The system of claim 13, wherein the associated event comprises a different version of the at least one event.

15. The system of claim 1, wherein capturing the at least one event associated with the media file comprises identifying the at least one event based at least in part on one or more of network activity, system activity, and media application activity.

16. The system of claim 1, wherein capturing the at least one event associated with the media file comprises identifying the at least one event based at least in part on a display area associated with a media application and identifying at least some of the event data by analyzing the display area.

17. The system of claim 1, wherein capturing the event at least one associated with the media file comprises identifying the at least one event based at least in part on calls to input or output devices and identifying at least some of the event data by analyzing the calls.

* * * * *